(12) United States Patent
Steinsiek et al.

(10) Patent No.: US 10,416,330 B2
(45) Date of Patent: Sep. 17, 2019

(54) COMPOSITE TRANSDUCER FOR DOWNHOLE ULTRASONIC IMAGING AND CALIPER MEASUREMENT

(75) Inventors: Roger R. Steinsiek, Houston, TX (US); Douglas J. Patterson, Spring, TX (US); Charles E. Redding, Houston, TX (US); Anjani R. Achanta, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 1321 days.

(21) Appl. No.: 12/392,487

(22) Filed: Feb. 25, 2009

(65) Prior Publication Data
US 2009/0213690 A1    Aug. 27, 2009

Related U.S. Application Data

(60) Provisional application No. 61/032,007, filed on Feb. 27, 2008.

(51) Int. Cl.
*G01V 1/52* (2006.01)
*G01V 1/40* (2006.01)
*B06B 1/06* (2006.01)

(52) U.S. Cl.
CPC ............ *G01V 1/52* (2013.01); *G01V 1/40* (2013.01); *B06B 1/0629* (2013.01)

(58) Field of Classification Search
CPC ... G01V 1/50; G01V 1/40; G01V 1/44; G01V 1/52; E21B 47/0005; E21B 47/101
USPC .............................. 367/35, 69, 86; 181/105
See application file for complete search history.

(56) References Cited

U.S. PATENT DOCUMENTS

| | | | | |
|---|---|---|---|---|
| 4,577,506 A * | 3/1986 | Poole et al. | | 73/633 |
| 4,780,862 A * | 10/1988 | Clerke | | 367/35 |
| 5,212,353 A * | 5/1993 | Rambow et al. | | 181/106 |
| 5,502,686 A | 3/1996 | Dory et al. | | |
| 5,541,889 A | 7/1996 | Priest et al. | | |
| 5,625,149 A * | 4/1997 | Gururaja et al. | | 367/162 |
| 5,869,189 A | 2/1999 | Hagood, IV et al. | | |
| 5,950,291 A * | 9/1999 | Gentilman et al. | | 367/155 |
| 6,466,415 B1 | 10/2002 | Terunuma et al. | | |
| 7,075,215 B2 | 7/2006 | Yogeswaren | | |
| 7,128,720 B2 * | 10/2006 | Podany | | 601/3 |
| 7,798,971 B2 * | 9/2010 | Flesch et al. | | 600/459 |
| 2006/0067162 A1 * | 3/2006 | Blankinship et al. | | 367/35 |
| 2007/0070811 A1 * | 3/2007 | Castillo | | 367/69 |

FOREIGN PATENT DOCUMENTS

GB    2355528 A  *  4/2001

OTHER PUBLICATIONS

B. Valant-Spaight et al.; "Field Examples with a Slim LWD Density/Neutron Instrument Containing a Californium-252 Neutron Source and Three Neutron Detectors," SPWLA 47th Annual Logging Symposium, Jun. 4-7, 2006, Paper CCC, pp. 1-12.

* cited by examiner

*Primary Examiner* — Ian J Lobo
(74) *Attorney, Agent, or Firm* — Mossman, Kumar & Tyler, P.C.

(57) ABSTRACT

A transducer assembly for downhole imaging includes a 1-3 Piezoelectric composite transducer of high Q ceramic rods in a polymer matrix. The assembly also includes a Teflon® window, a fluid-filled cavity adjacent to the window, and impedance matching material between the composite transducer and the fluid. The transducer is positioned to reduce the reverberation time.

11 Claims, 6 Drawing Sheets

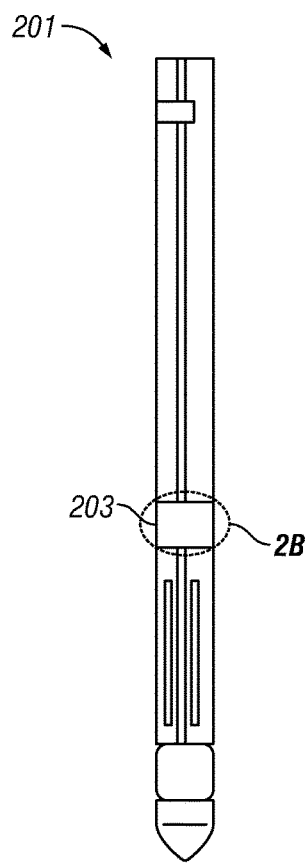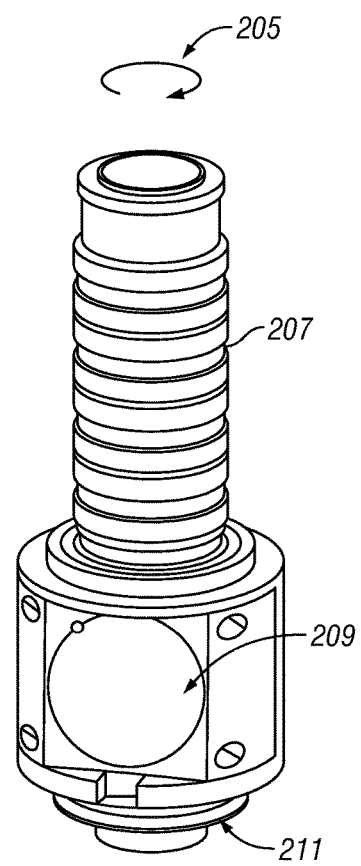
FIG. 2A  FIG. 2B

DICED PZT

EPOXY FILLED PZT

PIEZO-COMPOSITE ELEMENT

COMPOSITE TRANSDUCER FOR DOWNHOLE ULTRASONIC IMAGING AND CALIPER MEASUREMENT

CROSS-REFERENCES TO RELATED APPLICATIONS

This application claims priority from U.S. Provisional Patent Application Ser. No. 61/032,007 filed on Feb. 27, 2008.

FIELD OF THE PRESENT DISCLOSURE

A downhole acoustic logging tool is provided for imaging the texture and structure of the borehole sidewall. The level of the acoustic signals reflected from the wall is enhanced by using a composite transducer in a borehole with highly attenuating borehole fluids.

BACKGROUND OF THE PRESENT DISCLOSURE

Typical acoustic logging tools may include, by way of example, a circumferential televiewer which comprises a rotating ultrasonic acoustic transducer that operates in a frequency range on the order of 100 kHz or more. Higher acoustic frequencies are preferred in order to achieve better resolution in the confined space of a borehole. In operation, the televiewer rotates at a desired rate such as 5 to 16 rotations per second to continuously scan the borehole sidewall as the televiewer is drawn up the borehole at a rate that is typically $3/16$ to $3/8$ inch per scan. A beam of acoustic pulses is launched along the normal to the borehole sidewall as the transducer scans the interior surface of the borehole. The pulse rate depends upon the desired spatial resolution such as 1500 pulses per second or 128 to 256 pulses per scan. The insonified borehole sidewall returns pulses reflected therefrom, back to the transducer on a time-multiplexed basis. The reflected acoustic signals are detected, amplified and displayed to provide a continuous picture of the texture and structure of the borehole sidewall. Other application include determination of the goodness of a cement bond to a steel casing as well as monitoring the integrity of the casing itself.

The diameter of a borehole logger is on the order of $2\frac{7}{8}$ in (7.3 cm), so that it can be run into relatively small boreholes. However many borehole diameters are on the order of 10-14" (25.4-35.6 cm) or more such that the length of the acoustic-pulse trajectory from the transducer, through the borehole fluid to the borehole sidewall, may be up to 10" (25.4 cm). In the normal course of events, the borehole fluid is contaminated by drill cuttings, air bubbles and foreign matter which severely attenuate the acoustic energy by scattering because the physical dimensions of the contaminants are comparable to the wavelength of the wavefields emitted by the transducer.

What is even more troublesome, however, is the complication that the acoustic attenuation coefficient in certain types of drilling fluid such as heavily-weighted oil-based muds is very high, on the order of 5 dB/cm. Since the reflected acoustic signals must propagate over a two-way travel path, the maximum path length through the highly-attenuating drilling fluid should normally be kept well under 4 cm. Even that short path length may result in an attenuation of 20 dB. Although it is true that the coefficient of attenuation diminishes with decreasing acoustic frequency, space considerations and resolution requirements do not permit the use of large, low-frequency transducers. U.S. Pat. No. 5,541,889 to Priest having the same assignee as the present disclosure teaches an apparatus in which televiewer signals from a rotary sidewall acoustic-beam scanner is improved by replacing the volume of borehole drill fluid that lies in the path of the acoustic beam with a solid medium characterized by a lower coefficient of attenuation than that of the drill fluid. A mud excluder assembly is used for the purpose. The excluder assembly includes a solid shroud of polymethylacrylate, polycarbonate polymethylflouroethylene, polyphenylsulfide or polymethylpentane or any other solid medium that has an acceptably low coefficient of acoustic attenuation. An added constraint of the shroud is that its acoustic impedance should match as closely as possible the acoustic impedance of the fluid inside the enclosure as well as the fluid bathing the exterior of the shroud.

It would be desirable to have an apparatus and method with a simpler structure that is able to make acoustic measurements of a borehole wall when the borehole includes a highly attenuating fluid. The present disclosure addresses this need.

SUMMARY OF THE PRESENT DISCLOSURE

One embodiment of the disclosure is an apparatus configured to evaluate an earth formation. The apparatus includes a rotatable transducer assembly, a composite transducer on the rotatable transducer assembly configured to propagate an acoustic signal through an acoustically transparent window into a borehole and receive a reflection from a wall of the borehole, and at least one processor configured to use the reflection obtained at a plurality of orientations of the transducer during rotation of the transducer assembly to provide an image of the earth formation.

Another embodiment of the disclosure is a method of evaluating an earth formation. The method includes conveying a rotatable transducer assembly into a borehole, using a composite transducer on the rotatable transducer assembly configured to propagate an acoustic signal through an acoustically transparent window into the borehole and receive a reflection from a wall of the borehole, and using the reflection obtained at a plurality of orientations of the transducer during rotation of the transducer assembly to provide an image of the earth formation.

Another embodiment of the present disclosure is a computer-readable medium accessible to at least one processor, the computer-readable medium including instructions which enable the at least one processor to use a reflected signal from a borehole wall resulting from generation of an acoustic signal by a composite transducer on a rotatable transducer assembly in the borehole and transmission of the generated acoustic signal through an acoustically transparent window on the transducer assembly into the borehole.

BRIEF DESCRIPTION OF THE DRAWINGS

The present disclosure is best understood with reference to the accompanying figures in which like numerals refer to like elements and in which:

FIG. 2A shows the rotator assembly;

FIG. 2B shows the transducer assembly;

DETAILED DESCRIPTION OF ILLUSTRATIVE EMBODIMENTS

Figure 1:
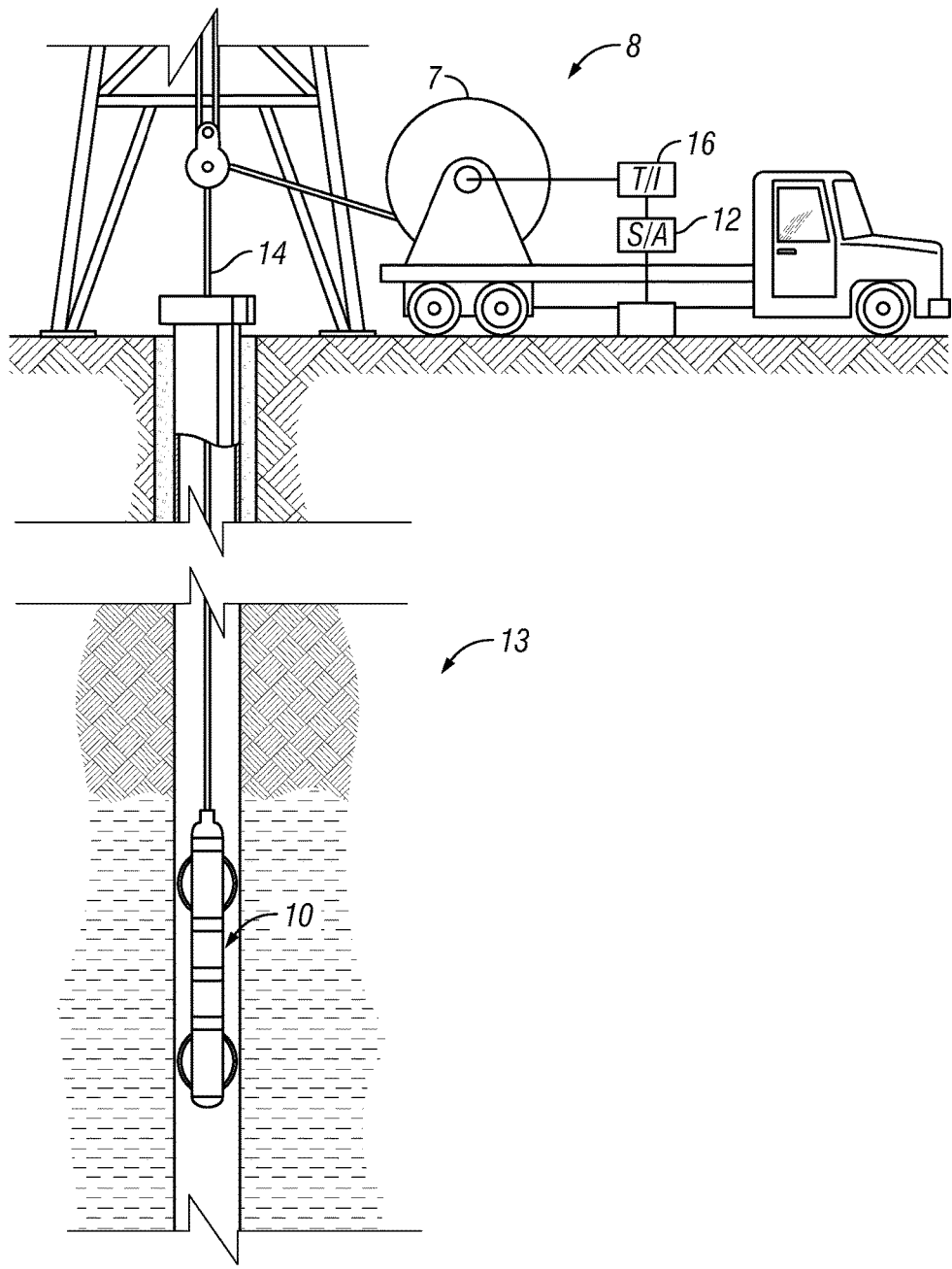
FIG. 1 shows an imaging well logging instrument disposed in a wellbore drilled through earth formations.

Referring to FIG. 1, a well logging instrument 10 is shown being lowered into a wellbore 2 penetrating earth formations 13. The instrument 10 can be lowered into the wellbore 2 and withdrawn therefrom by an armored electrical cable 14. The cable 14 can be spooled by a winch 7 or similar device known in the art. The cable 14 is electrically connected to a surface recording system 8 of a type known in the art which can include a signal decoding and interpretation unit 16 and a recording unit 12. Signals transmitted by the logging instrument 10 along the cable 14 can be decoded, interpreted, recorded and processed by the respective units in the surface system 8.

FIG. 2A shows mandrel section 201 of the imager instrument with a Teflon® window 203. Shown in FIG. 2B is the rotating platform 205 with the ultrasonic transducer assembly 209. The rotating platform is also provided with a magnetometer 211 to make measurements of the orientation of the platform and the ultrasonic transducer. The platform is provided with coils 207 that are the secondary coils of a transformer that are used for communicating signals from the transducer and the magnetometer to the non-rotating part of the tool. The transducer 209 is discussed further below.

Figure 3A:
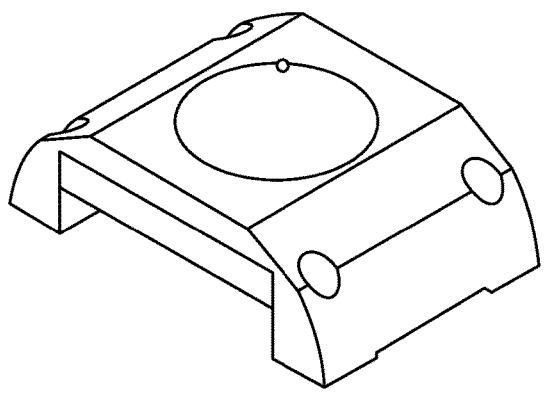
FIGS. 3A and 3B show some details of the transducer assembly.
Figure 3B:
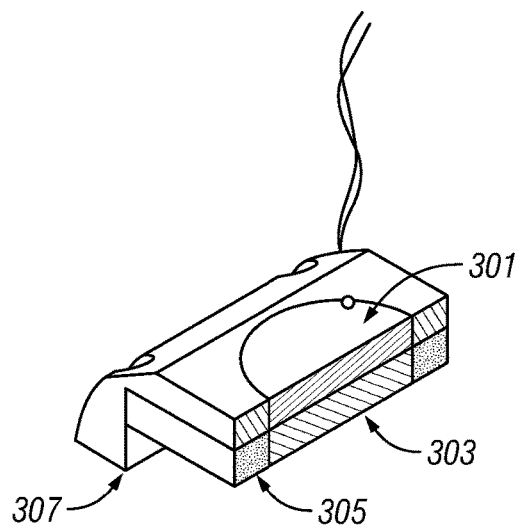

FIG. 3A shows the transducer assembly while FIG. 3B shows some details of the transducer assembly. This includes the actual transducer 301, the backing 303, and a polymer material 305. The transducer is mounted in a brass frame indicated by 307.

Figure 4:
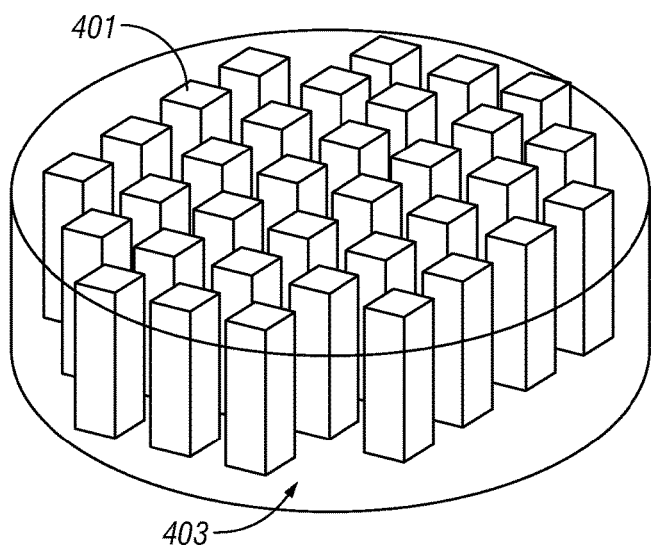
FIG. 4 shows the structure of the transducer.

FIG. 4 shows an exemplary transducer. The transducer is a composite transducer that includes a plurality of Piezo-electric transducer (PZT) rods 401 set in a polymer matrix 403. The PZT rods may be made of ceramic with a high quality factor (Q). As discussed by Fleury et al:

The properties of these materials imply a certain number of specific characteristics as: —acoustical impedance: located between the one of the polymer material and the one of the ceramic material. In practice, it is adjusted between 8 and 12 MRayleigh, which allows a good transfer of energy in a large frequency band when the impedance of the coupling medium is low, which is always the case for immersion testing.

coupling coefficient: its high value also contributes to the increase of energy transfer and to the widening of the bandwidth. These materials, thanks to the double effect of a low acoustical impedance and a high coupling coefficient, make possible a quite important improvement of the ratio sensitivity/bandwidth compared to the performances of the traditional transducers.

electrical impedance: the judicious choice of the constituents and their respective proportions allow to adjust the electrical impedance and to favour, in that way, the matching of the transducer to its electrical environment.

shaping: it is linked to the thermal and mechanical properties of the polymer phase.

lateral modes: they are strongly attenuated with this type of material and associated parasitic effects are consequently reduced.

cross coupling: this parameter is very important for the design of multielements transducers. The anisotropy of these materials on the mechanical, dielectrical and piezo-electric aspects allows, thanks to a simple deposit of electrodes having the required geometry, to surround the active zones which have a low interaction with the adjacent zones.

In the context of the present disclosure, the strong attenuation of the lateral modes and the lack of cross-coupling enables the use of PZT rods that have a higher Q than with prior art transducers. As would be known to those versed in the art, traveltime measurements commonly rely on picking of first arrivals, and attenuation estimates are based on measuring the frequency dispersion of signals. The high Q PZT generate much greater transmission and reception amplitudes than the low Q prior art transducers. The higher amplitudes extend the operating range of the instrument in heavily attenuating borehole fluids.

Figure 5A:
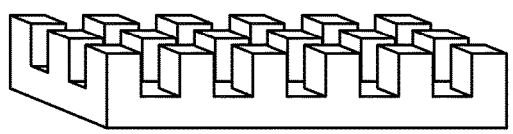
FIGS. 5A, 5B, and 5C illustrate how the composite transducer of FIG. 4 may be built.
Figure 5B:
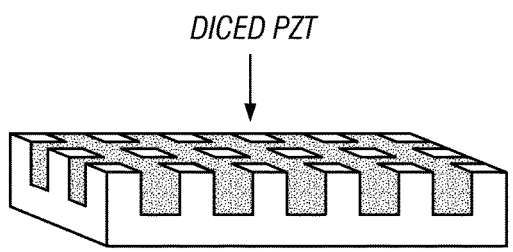
Figure 5C:
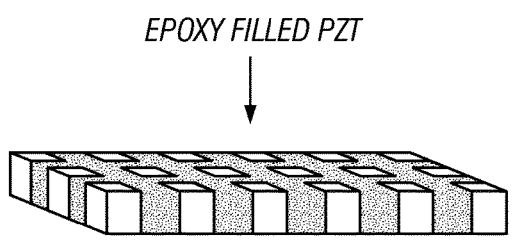

FIGS. 5A-5C schematically show how the composite transducer of FIG. 4 may be constructed. FIG. 5A shows a solid block of a PZT that has been diced to remove portions of the PZT while still retaining its integral structure. The removed portions are infilled with polymer (FIG. 5B). Finally, the base of the PZT structure is removed, leaving behind a plurality of PZT rods in a polymer matrix (FIG. 5C). It is possible to have the rods arranged in any geometric configuration, though the simple geometry shown is the easiest to fabricate.

Figure 6:
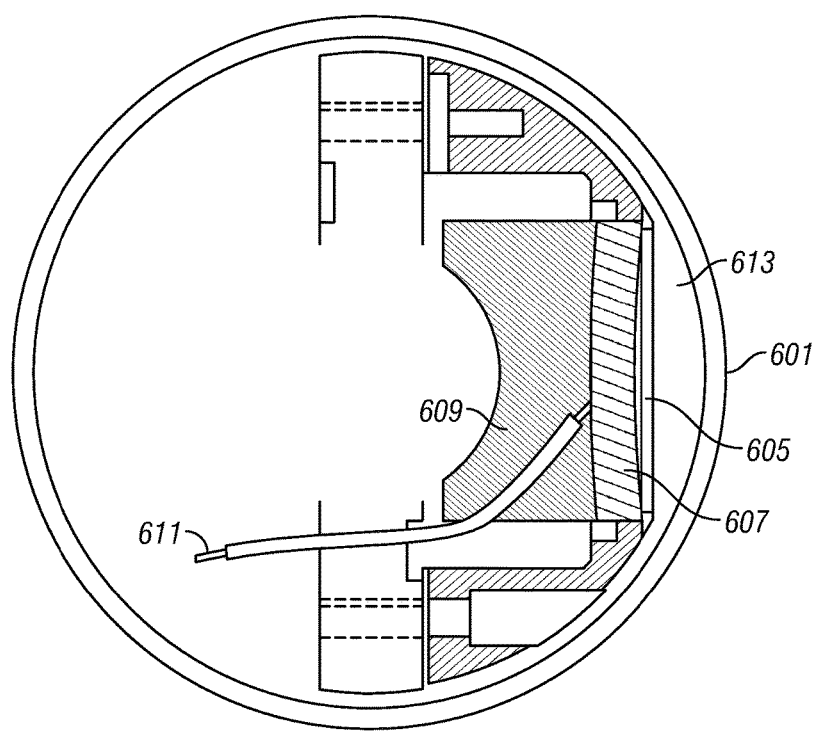
FIG. 6 illustrates a cross-section of the transducer assembly.

Turning now to FIG. 6, a cross section of a transducer assembly is shown. Depicted therein is the Teflon® window 601. One transducer is depicted by 607. The assembly may include a second transducer on the opposite side (not shown). The front portion of the transducer is in contact with an impedance matching material 605 that is used to match the impedance of the transducer with that of oil in the space 613 between the transducer and the Teflon® window. It should be noted that the use of Teflon® is not to be construed as a limitation and any other material with the necessary abrasion resistance and acoustic properties could be used.

Still referring to FIG. 6, the transducer assembly also includes a backing material 609. In one embodiment, the backing material is a 0-3 composite of tungsten particles in high temperature rubber. In another embodiment, liquid Viton®, a synthetic rubber may be used. The backing material absorbs acoustic signals propagating from the transducer away from the borehole wall and reduces reflections from the interface between the transducer and the backing material. Also shown in FIG. 6 are the leads 611 from the transducer that go to transformer coils 207.

Figure 7A:
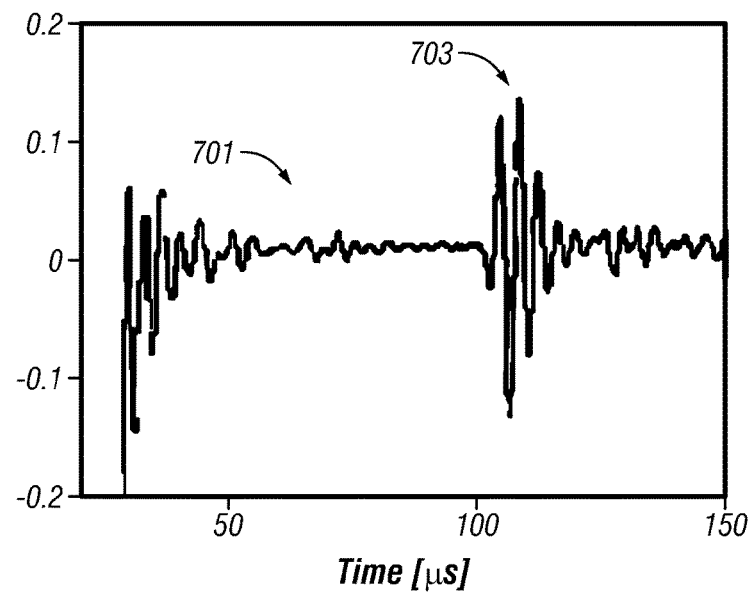
FIGS. 7A and 7B illustrate exemplary signals for two different distances of the transducer from the Teflon window.
Figure 7B:
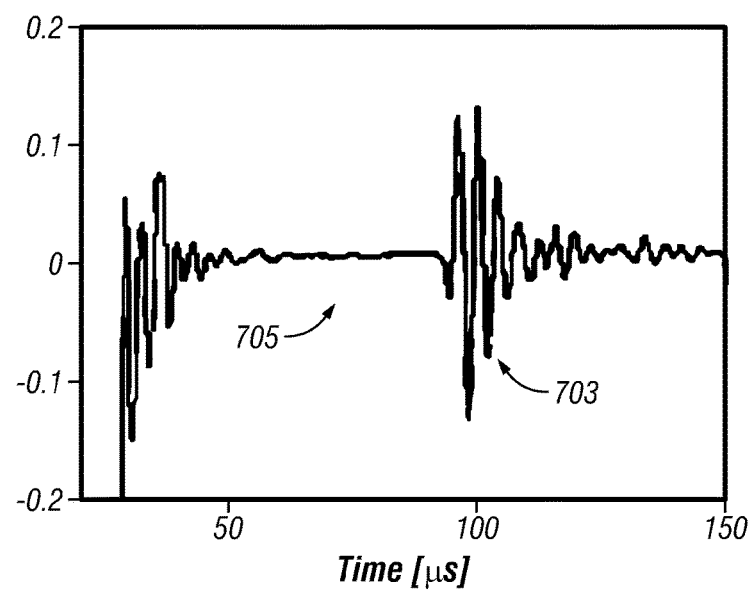

An important aspect of the disclosure is the reduction of reverberations within the transducer assembly, specifically between the transducer and the Teflon® window. FIG. 7A shows an exemplary signal recorded with a relatively longer spacing between the transducer and window. For this particular spacing, the reverberation time was approximately 75 µs. As a result of this, reverberations can still be seen, as indicated by 701. The signal 703 is the desired reflection from the borehole wall. The distance between transducer and the window may be adjustable. One advantage of having the adjustable distance is to reduce the reverberations. Shown in FIG. 7B is a signal recorded with a short of spacing (6.8 mm) between the transducer and window. The reverberation time is reduced to 42 µs. Consequently, at the time 705 corresponding to 701 in FIG. 7A, the reverberations have decayed significantly in FIG. 7B compared to FIG. 7A. Another advantage of having the distance adjustable is to provide improved acoustic transmission. Specifically, by having the distance substantially equal to a quarter wavelength to provide improved energy transfer between the oil in the cavity and the Teflon® window. The Teflon® window also has an advantage over alternate designs in which the window is not used but the rotating transducer is exposed to abrasive and highly viscous borehole fluids that can interfere with rotation of the transducer.

Once the data have been acquired, standard processing methods are used to provide an image of the borehole wall. This image may be based on the reflectance amplitude or on the travel time. See, for example, U.S. Pat. No. 5,502,686 to Dory et al., having the same assignee as the present disclosure.

The processing of the data may be done by a downhole processor and/or a surface processor to give corrected measurements substantially in real time. Implicit in the control and processing of the data is the use of a computer program on a suitable machine readable medium that enables the processor to perform the control and processing. The machine readable medium may include ROMs, EPROMs, EEPROMs, Flash Memories and Optical disks. Such media may also be used to store results of the processing discussed above.

What is claimed is:

1. An apparatus configured to evaluate an earth formation, the apparatus comprising:
   a rotatable transducer assembly surrounded by an acoustically transparent window and immersed in a fluid filling a cavity defined by the acoustically transparent window;
   a composite transducer on the rotatable transducer assembly configured to propagate an acoustic signal through the acoustically transparent window into a borehole filled with borehole fluid and receive a reflection from a wall of the borehole; and
   at least one processor configured to use the reflection obtained at a plurality of orientations of the transducer during rotation of the transducer assembly to provide an image of the earth formation;
   wherein the rotatable transducer assembly comprises an impedance matching material disposed between the composite transducer and the fluid; and
   wherein the assembly maintains a distance greater than zero between the composite transducer and the acoustically transparent window during rotation of the assembly, the assembly being configured via the distance selected to: (i) reduce a reverberation time of a reverberation therebetween, and (ii) improve acoustic coupling with the acoustically transparent window.

2. The apparatus of claim 1 wherein the composite transducer further comprises piezoelectric transducer (PZT) rods in a polymer matrix.

3. The apparatus of claim 1 further comprising a backing material on a side of the transducer opposite to the propagation of the acoustic signal through the acoustically transparent window configured to absorb acoustic signals.

4. The apparatus of claim 1 wherein the image produced by the at least one processor is selected from: (i) a traveltime image, and (ii) a reflectance image.

5. The apparatus of claim 1 wherein the rotatable transducer assembly is part of a logging string conveyed into the borehole on a wireline.

6. The apparatus of claim 1 wherein the composite transducer further comprises a ceramic having a high quality factor.

7. A non-transitory computer-readable medium product having instructions thereon that enable at least one processor to perform a method, the method comprising:
   producing an image of an earth formation using a reflected signal from a borehole wall resulting from generation an acoustic signal by a composite transducer on a rotatable transducer assembly surrounded by an acoustically transparent window and immersed in a fluid filling a cavity defined by the acoustically transparent window in the borehole and transmission of the generated acoustic signal through the acoustically transparent window on the transducer assembly into the borehole wherein the assembly maintains a distance greater than zero between the composite transducer and the acoustically transparent window during rotation of the assembly, the assembly being configured via the distance selected to: (i) reducing a reverberation time of a reverberation therebetween, and (ii) improving acoustic coupling with the acoustically transparent window;
   and wherein the rotatable transducer assembly further comprises an impedance matching material disposed between the composite transducer and the fluid.

8. The non-transitory computer-readable medium product of claim 7 further comprising at least one of: (i) a ROM, (ii) an EPROM, (iii) an EEPROM, (iv) a flash memory, and (v) an optical disk.

9. The apparatus of claim 1, wherein the distance is about a quarter wavelength of a frequency of the transducer.

10. The apparatus of claim 1 wherein the impedance matching material disposed between the composite transducer and the fluid is configured to acoustically match the acoustic impedance of the composite transducer to the acoustic impedance of the fluid.

11. The apparatus of claim 10 wherein the impedance matching material disposed between the composite transducer and the fluid is configured to maximize transmission of the propagating acoustic signal to the fluid.

* * * * *